July 31, 1956 J. LATZEN 2,757,029
BALL AND SOCKET JOINT
Filed Aug. 15, 1950
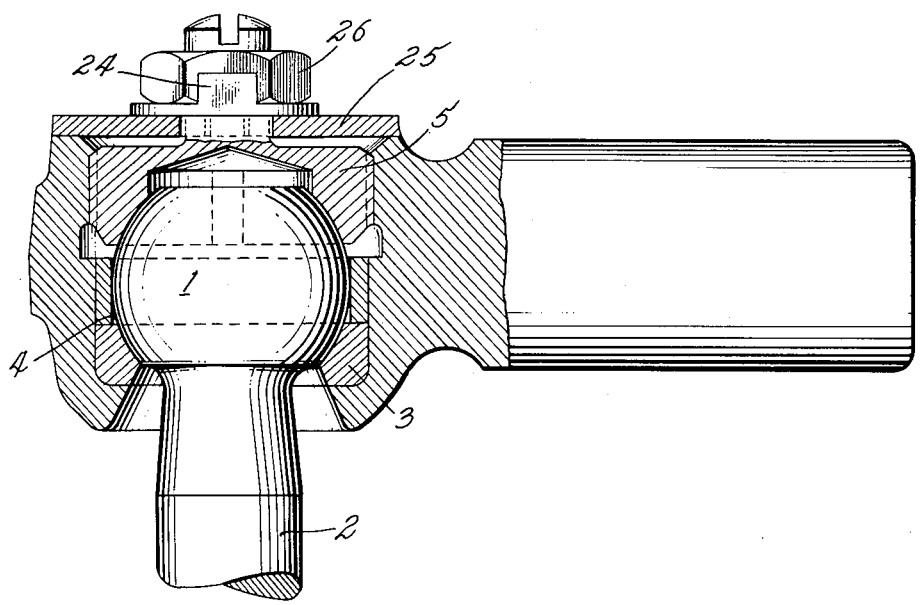
INVENTOR
*JOSEF LATZEN*
BY *Robert H. Jacob.*
ATTORNEY

United States Patent Office 2,757,029
Patented July 31, 1956

2,757,029

BALL AND SOCKET JOINT

Josef Latzen, Dusseldorf-Oberkassel, Germany, assignor to A. Ehrenreich & Cie, Dusseldorf-Oberkassel, Germany, a firm Application August 15, 1950, Serial No. 179,534

2 Claims. (Cl. 287—90)

My invention relates to ball and socket joints for various purposes, especially for steering gears, the ball head of the joint rod being supported in the joint housing within dish-shaped surfaces allowing the rod free motion angularly.

Object of the present invention is to provide an improved ball and socket joint ensuring a high resistance to wear.

According to prior art ball and socket joints the ball head is supported within the housing between an upper and a lower shell, the upper shell being spring-loaded. These well-known ball and socket joints have the disadvantage of not being capable of being loaded by considerable stresses directed vertically to the rod joint axis as in this case the loading plane crosses the space existing between the shells.

According to the present invention the ball bearing means within the housing comprise three parts, viz. a lower bearing shell at the exit of the housing, an intermediate ring for supporting the vertical middle zone of the ball, and a closure cap. Such a design provides that the shearing forces are taken up in the plane of application, thus enabling a free motion of the ball headed rod during the action of these shearing stresses and reducing wear. A special advantage results from allowing the intermediate ring to embrace the ball head closely without any play since working difficulties are avoided. Lateral impact effect and consequently a premature destruction of the ball and socket joint are prevented.

Other advantages obtained will be disclosed hereinafter.

The structural features of the ball and socket joint according to this invention are described in the following specification and will be better understood by the man skilled in the art if reference is made to the accompanying drawing.

The ball head 1 of a joint rod 2 is supported within a housing by ball bearing means substantially comprising a lower bearing shell, an intermediate ring, and a closure cap.

As shown the ball bearing means comprise a lower bearing shell 3 at the exit of the housing, a cylindrical intermediate ring 4 resting upon the lower bearing shell 3 and enclosing the middle zone of the ball head 1, and a closure cap 5 mounted to permit play between the closure cap 5 and the ball head 1.

The closure cap 5 is provided with both a bearing surface for the ball head 1 and a threaded pin extending through a closing disc 25 and carrying a nut 26 by means of which the threaded pin is tightened, thus securing the closure cap 5. A locking washer 24 prevents the nut 26 from releasing.

Various structural changes and modifications may be made in ball and socket joints of the type herein disclosed, without departing from the spirit and the salient features of this invention.

What I claim is:

1. A ball and socket joint, particularly for steering gears, comprising a ball headed rod, a cup-shaped housing adapted to permit angular movements of said rod, bearing means around the ball of said rod defining a lower bearing area, an upper bearing area and an intermediate bearing area, and a closure cap, said intermediate bearing area being cylindrical and disposed tangentially of the central zone of the ball transversely of the axis of said ball headed rod, thereby avoiding shearing effects by edges on said lower or upper bearing areas centrally of said ball.

2. Ball and socket joint, particularly for steering gears, comprising a ball headed rod, a cup shaped housing disposed around the ball head and having an aperture proximate the neck portion of said rod to permit angular movement of said rod, a seat for the ball head in said housing adjacent said aperture, a seat for the ball head in said housing adjacent the side opposite the side having said aperture, and an intermediate member disposed in the plane extending centrally of said ball head substantially transversely of the axis of said rod, said member having engagement along its inner side with said ball head and along its outer side with said housing and constituting a guiding member having linear engagement along a circumferential line on at least one of said sides.

References Cited in the file of this patent

UNITED STATES PATENTS

| 897,460 | Greenlaw | Sept. 1, 1908 |
| 908,414 | Mellin | Dec. 29, 1908 |
| 1,693,840 | Faudi | Dec. 4, 1928 |
| 1,830,062 | Hufferd et al. | Nov. 13, 1931 |
| 2,181,300 | Flumerfelt | Nov. 28, 1939 |

FOREIGN PATENTS

| 227,036 | Great Britain | Jan. 8, 1925 |
| 765,514 | France | June 12, 1934 |